Aug. 26, 1958 S. E. MILLER 2,849,683

NON-RECIPROCAL WAVE TRANSMISSION

Filed July 31, 1953 4 Sheets-Sheet 1

INVENTOR
S. E. MILLER
BY Roy M. Porter, Jr.
ATTORNEY

INVENTOR
S. E. MILLER
BY Roy M. Porter, Jr.
ATTORNEY

Aug. 26, 1958 S. E. MILLER 2,849,683

NON-RECIPROCAL WAVE TRANSMISSION

Filed July 31, 1953 4 Sheets-Sheet 3

INVENTOR
S. E. MILLER
BY Roy M. Porter, Jr.
ATTORNEY

NON-RECIPROCAL WAVE TRANSMISSION

Filed July 31, 1953 4 Sheets-Sheet 4

INVENTOR
S. E. MILLER
BY Roy M. Porter, Jr.
ATTORNEY

United States Patent Office
2,849,683
Patented Aug. 26, 1958

2,849,683

NON-RECIPROCAL WAVE TRANSMISSION

Stewart E. Miller, Middletown, N. J., assignor to Bell Telephone Laboratories, Incorporated, New York, N. Y., a corporation of New York Application July 31, 1953, Serial No. 371,437
20 Claims. (Cl. 333—10)

This invention relates to electrical transmission systems and, more particularly, to multibranch circuits having non-reciprocal transmission properties for use in said systems.

It is an object of the invention to establish non-reciprocal electrical connections between a plurality of branches of a multibranch network by new and simplified apparatus.

Recently, the electromagnetic wave transmission art has been substantially advanced by the development of a whole new group of non-reciprocal transmission components. A large number of these have utilized one of the non-reciprocal properties of gyromagnetic materials, most often designated ferromagnetic materials or ferrites. One of the more important of these components is a multibranch network known as a "circulator" circuit. While the several circulators heretofore invented have had different physical appearances and structural arrangements, each having its own specific advantage and usefulness, each has had the electrical property that energy is transmitted in circular fashion around the branches of the network so that energy appearing in one branch thereof is coupled to only one other branch for a given direction of transmission, but to another branch for the opposite direction of transmission. This affords a circuit component with an entirely new electrical property.

Numerous applications of the circulator as a circuit element have been devised. It has been included in modulator circuits and in compressing and expanding circuits. It has been used as a TR-box type coupling between an antenna, transmitter and receiver circuits, as a channel dropping or branching circuit in multichannel microwave systems, and in many other applications. Intuitively, those familiar with the art feel that the surface of the many applications of the circulator has only been scratched, and numerous other applications are being continually conceived.

It is another object of the present invention to provide new and improved types of circulators.

In accordance with the present invention, it has been found that the magnetic field of wave energy in a bounded transmission structure, such as a hollow conductive wave guide, is displaced transversely in the structure when a polarized gyromagnetic element is included within the structure. This displacement is different for opposite directions of wave propagation through the structure. A principal feature of the present invention resides in a second wave-guide structure coupled to magnetic field components in the first structure which are zero for one direction of propagation. For the opposite direction of propagation, there are substantial magnetic field components at the coupling point. Thus, wave energy in the first structure is coupled into the second structure for only one direction of propagation of the energy in the first.

In a first embodiment of the invention, the two structures take the form of longitudinally coupled wave guides, similar in form to certain conventional directional couplers. This results in a four terminal circulator. In a modification of the first embodiment wherein dissipative material is included in one structure, it becomes a one-way transmission device or isolator circuit by which energy propagated in one direction along a transmission path may be dissipated.

In a second embodiment of the invention, the two structures take the form of a wave-guide T-junction. This results in a three terminal circulator. In a modification thereof, filter properties are also included in the circulator.

In a third embodiment of the invention, the two structures take the form of crossed guides with the additional advantage of particular ease of adjustability.

In another embodiment, electromagnetic modes of propagation in wave guides of circular cross-section are employed.

While the present invention provides an entirely new circulator configuration which is difficult to compare in all respects with the prior art devices, certain primary advantages may be pointed out. First the present invention reduces the magnetizing field strength required for a circulator circuit employing ferromagnetic material and thereby reduces the bulk and expense of the circulator. In this connection, it will be recalled that in certain of the prior art circulators, use has been made of the Faraday-effect rotation of wave energy exhibited by a ferromagnetic element in the presence of a longitudinal magnetizing field. The present invention, however, utilizes the displacement effect noted above which requires at least no greater magnetizing field than the Faraday effect. Furthermore, the magnetizing fields of the present embodiment are applied transversely to the material by a structure affording a magnetic path which is almost completely composed of magnetic material. This fact greatly reduces the strength required of the biasing magnetic field over that required in the prior art devices since in the latter, a large portion of the magnetic path exists through non-magnetic materials.

Furthermore, the present invention provides a circulator circuit that operates directly and exclusively with wave energy in one type of guide cross-section. As opposed to this in most of the prior wave-guide circulators, it was necessary to convert between waves in a guide of rectangular cross-section to waves in a guide of circular cross-section at least once in the circulator configuration. Thus, the difficulties with tapered transitions, unwanted reflections, and mode degeneration which were formerly unavoidable consequences of this necessary conversion are now eliminated.

Additional features of the invention reside in the particular ferromagnetic configurations in wave-guide structures to produce a wave field displacement in accordance with the invention.

These and other objects and features, the nature of the present invention, and its various advantages, will appear more fully upon consideration of the various specific illustrative embodiments shown in the accompanying drawings and of the following detailed description of these drawings.

In the drawings:

Fig. 1 is a perspective view of the first principal embodiment of the invention showing two coupled wave guides and including within one a field displacement medium of polarized gyromagnetic material;

Fig. 2, given by way of illustration, shows the magnetic field configuration of a dominant mode wave in a rectangular wave guide;

Fig. 3, given by way of explanation, shows the displacement effect of a gyromagnetic medium upon the field of an electromagnetic wave;

Figure 1:
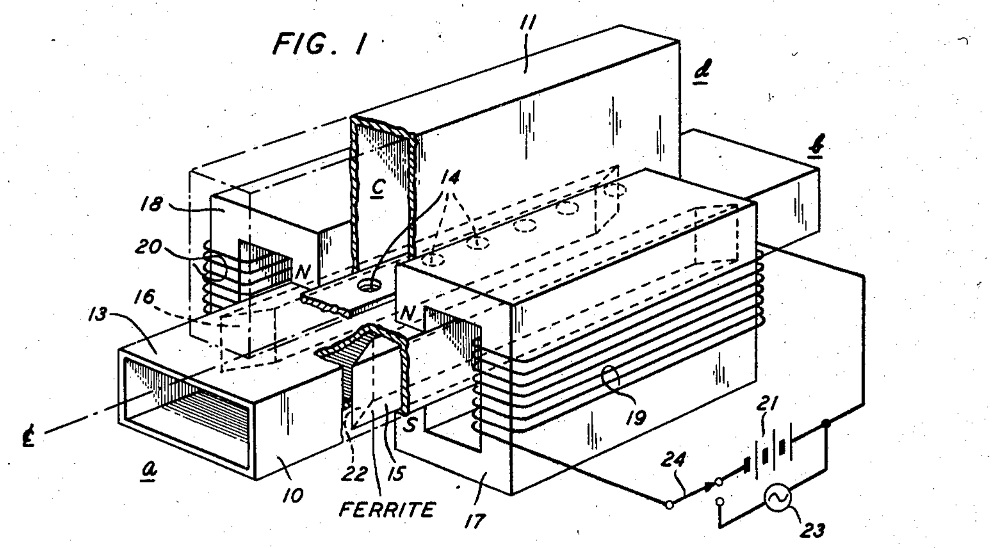

Referring more specifically to Fig. 1, a non-reciprocal four branch microwave network or four-branch circulator circuit is shown as an illustrative embodiment of the present invention. This network comprises a first section 11 of bounded electrical transmission line for guiding wave energy which may be a rectangular wave guide of the metallic shield type having a wide internal cross-sectional dimension of at least one-half wavelength of the wave energy to be conducted thereby and a narrow dimension substantially one-half of the wide dimension. Located adjacent line 11 and running for a portion of its length contiguous and parallel thereto is a second section 10 of transmission line, which has a wide internal cross-sectional dimension slightly smaller than that of guide 11 for the reason to be described. One narrow wall 12 of guide 11 is placed contiguous to a wide wall 13 of guide 10 slightly off the center line of wall 13 by approximately one-sixth to one-quarter of the wide dimension as will be discussed more fully hereinafter.

Lines 10 and 11 are electromagnetically coupled over an interval of several wavelengths by one of the several broad band coupling means familiar to the directional coupler art. This coupling may be, as illustrated, a plurality of elongated apertures 14 extending through contiguous walls 12 and 13 and distributed at intervals of less than one-half wavelength along the longitudinal length of lines 10 and 11. Apertures 14 are located on substantially the center line of wall 12 and, therefore, are displaced from the center line of wall 13. For reference purposes hereinafter, the forward and backward ends of guide 10 are labeled terminals *a* and *b*, respectively, and the forward and backward ends of guide 11 are labeled terminals *c* and *d*, respectively.

Included within guide 10 is means for producing a non-reciprocal displacement of the magnetic field pattern of wave energy therein. In particular, guide 10 is partially filled in the region of coupling by a polarized gyromagnetic medium or a medium having electrical and magnetic properties of the type derived from the mathematical analysis of D. Polder in Philosophique Magazine, January 1949, vol. 40, pages 99 through 115. As illustrated by way of example in Fig. 1, guide 10 includes a pair of slab-like elements 15 and 16 located adjacent to the respectively opposite internal narrow walls of guide 10. The thickness of elements 15 and 16 may be on the order of at least one-tenth of the wave-guide width but may be much thicker as will be shown hereinafter. As a specific example of a gyromagnetic medium, elements 15 and 16 may be made of any of the several ferromagnetic materials combined in a spinel structure. For example, they may comprise an iron oxide with a small quantity of one or more bivalent metals, such as nickel, magnesium, zinc, manganese or other similar material in which the other metals combine with the iron oxide in a spinel structure. This material is known as a ferromagnetic spinel or a ferrite. Frequently, these materials are first powdered and then molded with a small percentage of plastic material, such as Teflon or polystyrene. As a specific example, elements 15 and 16 may be made of nickel-zinc ferrite prepared in the manner described in a publication of C. L. Hogan, "The Microwave Gyrator," in the Bell System Technical Journal, January 1952, and in his copending application Serial No. 252,432, filed October 22, 1951, which issued May 29, 1956 as United States Patent 2,748,353. The ends of elements 15 and 16 are provided with a wedge-like taper, for example, taper 22 of element 15, to prevent undue reflections of wave energy therefrom.

Elements 15 and 16 are biased in the same direction by a steady magnetic field of a strength to be described at right angles to the direction of propagation of the wave energy in guide 10. As illustrated in Fig. 1, this field may be separately supplied by solenoid structures comprising magnetic cores 17 and 18, respectively, having pole pieces N and S bearing upon opposite longitudinal edges areas of the wide wall 13 of guide 10 in the region of elements 15 and 16, respectively. Turns of wire, for example turns 19 and 20, on cores 17 and 18, respectively, are so wound and connected through switch 24 to a source of potential, such as 21, that they produce like magnetic poles on the same side of guide 10, for example N poles adjacent to wall 13 of guide 10 and S poles on the lower side of guide 10, as illustrated in Fig. 1. These fields may, however, be supplied by an electrical solenoid with a metallic core of other suitable physical design, by a solenoid without a core, by a permanent magnetic structure, or the ferromagnetic elements may be permanently magnetized, if desired. Since elements 15 and 16 occupy substantially the complete volume between the pole pieces of magnetic cores 17 and 18, respectively, the magnetizing strength required by the solenoids to produce a given intensity of magnetization in elements 15 and 16 is much less than would be required if this magnetic path included a substantial air gap. This advantage is afforded by the joint requirement of a transverse field applied to a transversely extending element.

Figures 2, 3, 4:
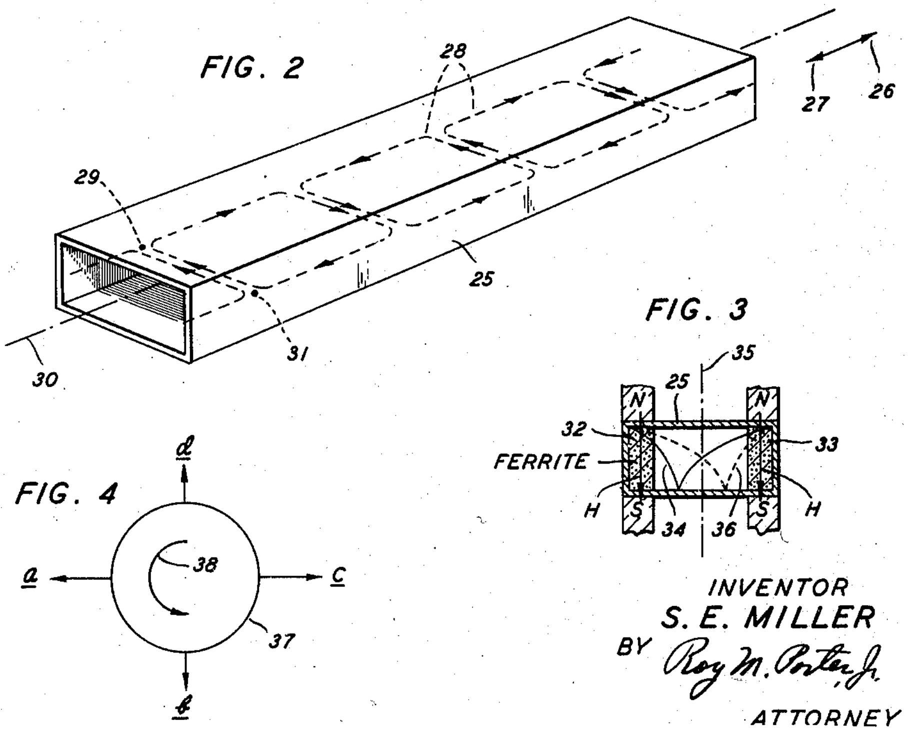
Fig. 4 is a schematic representation of the circulator coupling characteristic for the embodiment of Fig. 1.

The displacement effect of elements 15 and 16 upon wave energy propagated along guide 10 may most readily be understood by referring to explanatory Figs. 2 and 3. In Fig. 2 are shown, for the purposes of illustration, representative loops 28 of the high frequency magnetic field of a dominant mode wave in a rectangular wave guide 25 at a particular instant. In this figure the arrows 26 and 27 indicate the forward and backward directions of propagation, respectively, of the wave in guide 25, and the arrows on the individual loops 28 indicate their polarity at any particular point in the guide at a given instant.

It will be noted that the lines 28 of magnetic intensity are loops which lie entirely in a plane which is parallel to the wide dimension of guide 25. It will then be noted that at a point 29 on the left-hand side of center line 30 in guide 25 or at a point 31 on the right-hand side of center line 30, the magnetic intensity of the wave is circularly polarized, as the wave propagates along guide 25. For a wave propagating in the forward direction, a counterclockwise rotating component of the magnetic intensity is presented at point 29 and a clockwise rotating component at point 31. However, for propagation through guide 25 in the backward direction, i. e., in the direction of arrow 27, the circularly polarized components as seen at points 29 and 31 will rotate in respectively opposite directions from those seen for the forward direction of propagation. Finally, it should be noted that the intensity of the longitudinal magnetic field components in guide 25 is zero along the center line 30 of the wider wall and increases symmetrically to a maximum at the narrower walls.

In the cross-sectional view of Fig. 3, ferro-magnetic elements 32 and 33 are added at opposite sides of guide 25. These correspond to elements 15 and 16 in Fig. 1. While elements 32 and 33 are demagnetized, the cross-sectional distribution of wave energy in the guide is still symmetrical and the minimum of longitudinal magnetic field intensity of the wave falls on center line 35. However, as the biasing magnetic field is applied, as represented schematically on Fig. 3 by the transverse vectors labeled H between pole pieces labeled N and S, the effect is to concentrate the lines of magnetic field into a given side of the guide as viewed in the direction in which the wave is propagating, or from another viewpoint, to displace the field pattern of wave energy propagated along the guide oppositely in space for opposite directions of transmission. The reason for this is that a wave in a gyromagnetic medium which has a radio frequency magnetic field at right angles to the biasing magnetic field and which rotates counter-clockwise when viewed in the direction from the N to the S pole of the biasing field, has a permeability which increases as the intensity of the biasing field is increased. Conversely, a similar wave which has a clockwise rotating magnetic field has a permeability which decreases as the intensity of the biasing field is increased.

One physical explanation which has been advanced to explain this phenomenon involves the recognition that the ferromagnetic materials contain unpaired electron spins which tend to line up with the applied magnetic field. From this recognition stems the suitability of the term "gyromagnetic medium" to designate media having unpaired electron spins. These spins and their associated moments can be made to precess about the line of the biasing magnetic field, keeping an essentially constant component of the moment in the direction of the applied biasing field but providing a magnetic moment which may rotate in a plane normal to the field direction. These magnetic moments have a tendency to precess in one angular sense but to resist rotation in the opposite sense. When the high frequency magnetic intensity of the wave energy is rotating in the same sense as the preferred direction for precession of the magnetic moment, the wave will encounter a permeability less than unity. When the high frequency magnetic intensity is rotating in the opposite angular direction, however, the wave will encounter a permeability greater than unity. This results in a difference in permeability experienced for oppositely polarized components and is observed for low values of the polarizing magnetic field below that field intensity which produces ferromagnetic resonance in the material.

Thus, in Fig. 3 for a wave propagating in the forward direction away from the viewer, a high permeability is presented to wave components on the left side of guide 25 and a low permeability to wave components on the right. This difference concentrates the lines of magnetic field in the left-hand side so that the plot of the absolute value of the longitudinal magnetic field intensity for the wave propagating away from the viewer may be represented by curve 34 in Fig. 3, having a zero longitudinal field intensity to the left of the center line 35. A wave propagating toward the viewer may be represented by curve 36 having a zero field intensity to the right of center line 35.

In a typical embodiment the position of zero field may be displaced away from the center line by one-sixth to one-quarter of the wide dimension of the wave guide, depending, of course, somewhat upon the composition of the ferromagnetic material and upon the strength of the magnetic field. In the usual embodiment the strength of the field should be such as to saturate the ferromagnetic element. This strength at the lower microwave frequencies, such as 4000 megacycles, is about 25 percent of the field required to produce ferromagnetic resonance in the material and is a much smaller percentage at higher frequencies.

Returning again to Fig. 1, the strength of the magnetic field which biases elements 15 and 16 is selected with respect to the location of apertures 14 so that apertures 14 lie along the position of zero longitudinal magnetic wave components in guide 10 for one direction of transmission, i. e., propagation in the forward direction from left to right as illustrated in Fig. 1. Thus, for transmission from left to right in guide 10 substantially no energy is coupled from line 10 into line 11 since the transverse magnetic field components in guide 10 do not excite a mode which can be supported by guide 11. For transmission from right to left in guide 10, the longitudinal magnetic field at apertures 14 is substantial and energy will be coupled between lines 10 and 11. The wide internal dimension of guide 11, as noted above, is larger than that of guide 10 and is chosen with respect to that of guide 10 so that guide 11 has the same phase constant for the coupled energy as guide 10 taking into account the dielectric effect of elements 15 and 16 in guide 10. This phase constant equality may be obtained, however, in guides of equal cross-section, by suitably loading guide 11 with an equivalent amount of dielectric in the region of coupling.

Thus, if a dominant mode microwave signal is applied to terminal *a* of guide 10, it will travel along guide 10 to terminal *b*, none of it being coupled through apertures 14 into guide 11. Substantially free transmission is, therefore, afforded from terminal *a* to terminal *b*. This condition is indicated schematically on Fig. 4 by the radial arrows labeled *a* and *b*, respectively, associated with ring 37 and arrow 38 diagrammatically indicating progression in the sense from *a* to *b*.

Should a wave be applied to terminal *b* of guide 10, it will travel in guide 10 to the left. Portions of it will be successively transferred into guide 11 by coupling apertures 14. So far as transmission of this energy in guide 11 in the opposite direction toward terminal *d* thereof is concerned, the structure is inherently a directional coupler, i. e., a minimum transmission of energy in the backward direction in guide 11 will be found since the collective effect of a large number of discrete coupling elements spaced at less than one-half wavelength apart is of itself directionally selective, as is well known in the directional coupler art. Any of the many distributions of a plurality of discrete points known to this art may, in addition, be used to improve the directivity or to increase the band width over which a given directivity is maintained. As to energy transmitted in the same direction in line 11 toward terminal *c* thereof, a first fraction of energy is transferred through the first coupling aperture 14 from line 10 to line 11 and experiences in this transfer a 90 degree phase delay. This energy travels to the left in guide 11 to the second aperture, whereby part of it is returned to line 10 with a further delay of 90 degrees. Thus, the energy which goes from line 10 to line 11 and back to line 10 by way of a later aperture arrives in line 10 out of phase with the energy which travels straight through line 10. On the other hand, all components in line 11 are in phase. A summation of such components eventually results in cancellation of the energy in line 10 and transfer thereof into line 11. This complete power transfer is dependent upon the integrated coupling strength factor which in turn is a function of the strength and distribution of the coupling between lines 10 and 11, as described in detail in my copending application Serial No. 325,488, filed December 11, 1952. As there disclosed, this factor is expressed $n \sin^{-1} C$, in which $n$ represents the number of discrete coupling points and C the coupling factor of each of these points. All power in line 10 is transferred to terminal $c$ of line 11 when this quantity is equal to $m\pi/2$ where $m$ is any odd integer. This transmission is indicated by arrow 38 on Fig. 4 which tends to turn the arrow $b$ in the direction of the arrow $c$.

Should energy now be applied to terminal $c$ of guide 11, it will experience substantially free transmission to terminal $d$ thereof since none of this power is transferred to terminal $b$ inasmuch as apertures 14 lie along points in the zero magnetic field for this direction of transmission in line 10, and none will appear at terminal $a$ of line 10 because of the directional coupling effect described above. This coupling is schematically indicated on Fig. 4 by the coupling from terminal $c$ to terminal $d$.

Energy applied to terminal $d$ of guide 11 will excite a wave traveling in guide 10 toward terminal $a$ and because of the conditions described above in connection with the transmission from terminal $b$ to terminal $c$, this energy applied at terminal $d$ will be completely transferred into line 10 to appear at terminal $a$. This transmission is indicated on Fig. 4 by the schematic connection between terminal $b$ and terminal $a$.

The coupling characteristic thus represented by Fig. 4 is the characteristic of a group of networks heretofore designated circulator circuits because they have electrical properties such that electrical energy appearing in one branch thereof is coupled to only one other branch for a given direction of transmission, but to another branch for the opposite direction of transmission. One important advantage of the present form of circulator resides in its use of a transversely applied magnetizing field and the ease with which this field may be applied to the ferromagnetic element in the present embodiment. In devices employing a longitudinal magnetizing field and also in some devices in which the field was transverse, a necessary large portion of the magnetic path existed through a non-magnetic path. This introduced a magnetic loss and hence, required a much larger magnetizing field. Note, however, that in the present embodiment an appreciable non-magnetic gap is unnecessary. It is only necessary that there be a fraction of a millimeter of guide wall metal between element 15 of Fig. 1, for example, and the magnetic material of the pole pieces of core 17. Indeed, if even this non-magnetic gap proved troublesome, the top and bottom walls of guide 10 could be made of a magnetic material, thus reducing the gap to zero.

The apparatus of Fig. 1 may also serve as a switch or modulator. As a modulator, the modulating current from a source 23 is applied to solenoid 19 by placing switch 24 in the other position shown. As a switch the polarity of source 21 may be reversed and the conduction between terminals will then take place in the order $a$, $d$, $c$, $b$, following the terminal designation employed above.

It is understood that the same modulator and switch operation applies to all embodiments to be described hereinafter even though the biasing magnetic field will be indicated on the drawings schematically by a vector labeled H of fixed magnitude and sense.

A one-way transmission device or isolator will result if guide 11 of Fig. 1 is filled or partially filled with a lossy or dissipative material. The resulting structure will allow transmission from terminal $a$ to terminal $b$, but any wave energy applied at terminal $b$ will be dissipated in the lossy material in guide 11.

Figures 5, 6:
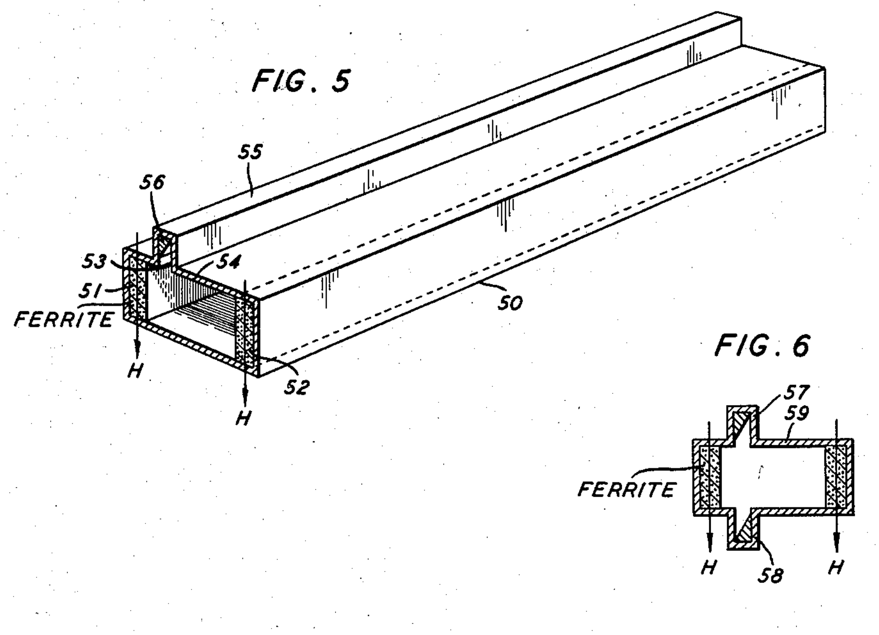
Fig. 5 illustrates a modification of Fig. 1 in which one wave guide of Fig. 1 is replaced by a wave dissipative chamber resulting in a one-way transmission device in accordance with the invention.
Fig. 6 shows how a pair of dissipative chambers of the type shown in Fig. 5 may be employed.

A modification of this isolator or one-way transmission device is represented in Fig. 5. Thus, Fig. 5 shows a section of rectangular guide 50 having slabs of ferromagnetic material 51 and 52 located along the side walls.

The biasing magnetic field is applied transversely as in Fig. 1 and is represented by the vectors labeled H. A long narrow slot 53 is located in the wide wall 54 at a position off center line of wall 54 at which position the magnetic field components of a wave traversing guide 50 in a direction of propagation away from the viewer will be zero. A narrow channel 55 is positioned above slot 53. A wedge of lossy dielectric material, such as carbon loaded polystyrene, is located in channel 55 sufficiently far from wall 54 so that other energy components of the wave propagating away from the viewer do not reach material 56. A wave, however, in guide 50 propagating toward the viewer will have strong longitudinal magnetic field components at slot 53, which will enter channel 55 and be dissipated therein by material 56.

Since the longitudinal magnetic field pattern of a wave is the same at both of the wide walls in the guide, Fig. 6 illustrates how a pair of loss chambers 57 and 58 may be oppositely located on both wide walls of a section 59 of wave guide to increase the dissipation for one direction of transmission.

Figures 7, 8, 9:
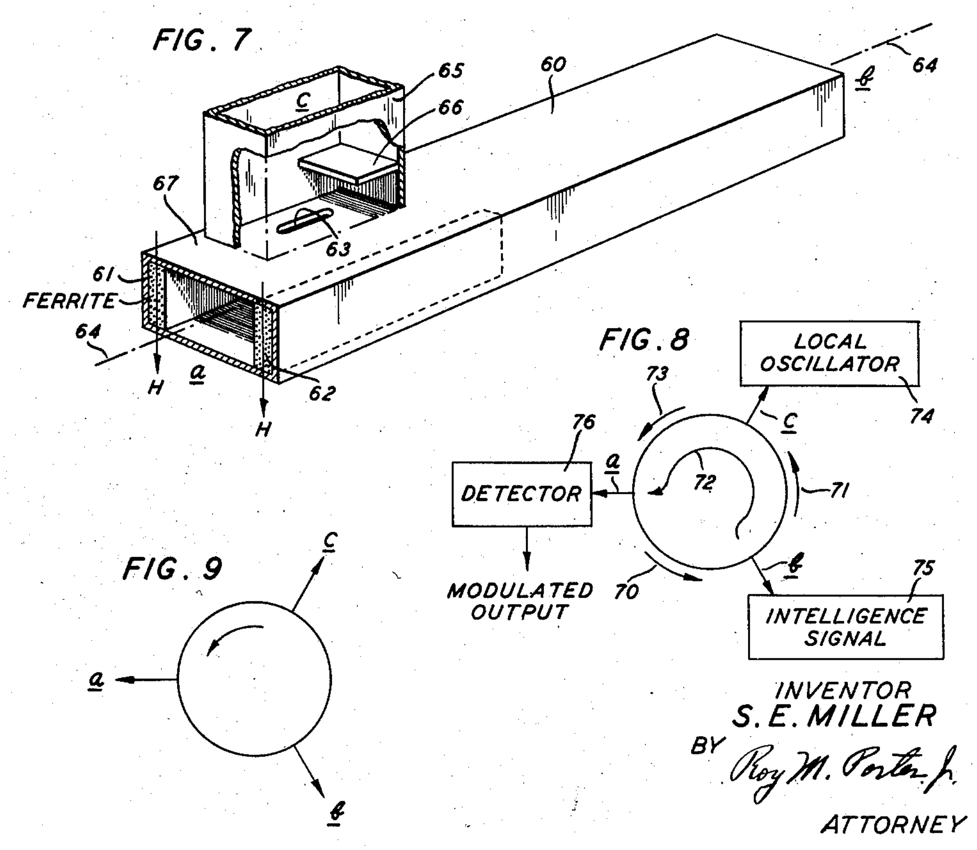
Fig. 7 is a perspective view of the second principal embodiment of the invention showing a junction of wave-guide sections and including within one a field displacement medium.
Fig. 8 is a schematic representation of the coupling characteristic of the apparatus of Fig. 7 resulting from one advantageous adjustment thereof and, in addition, schematically shows a typical use for this characteristic.
Fig. 9 is a schematic representation of the circulator coupling characteristic of the apparatus of Fig. 7 resulting from another adjustment thereof.

In Fig. 7 a three branch non-reciprocal microwave network or circulator is shown employing the principles of the invention which has particular advantage in its compactness. This network comprises a first section 60 of rectangular wave guide having ferromagnetic elements 61 and 62 located therein in the same manner as the ferromagnetic elements in the embodiments described above. Elements 61 and 62 are biased by a transverse magnetic field represented schematically by the vector labeled H. An elongated aperture 63 is located in the top wide wall 67 of guide 60. Centered about aperture 63 with its transverse end abutting and connected to wall 67 and making a T-type junction with guide 60 is a second rectangular guide 65. The wide dimension of guide 65 is parallel to the axis of guide 60. Aperture 63 will couple between longitudinal magnetic field components in guide 60 and the transverse magnetic field components in guide 65. The transverse components in guide 60 will not excite a mode which can be supported in guide 65. For convenience in the explanation which follows, the forward and backward ends of guide 60 are labeled terminals $a$ and $b$, respectively, and the upper end of guide 65 is labeled terminal $c$.

If aperture 63 were located on center line 64 of guide 60 and no magnetic field were applied to elements 61 and 62, there would be no coupling between guides 60 and 65 since, as noted above, the longitudinal magnetic field at this location would be zero. As the magnetic field is increased, however, the displacement of the field pattern described above in connection with Fig. 3 takes place. Terminal $c$ of guide 65 will then be coupled with equal strength in one phase to wave energy propagating from terminal $a$ to terminal $b$ in guide 60 and in the opposite phase to wave energy propagating from terminal $b$ to terminal $a$. Reversing the polarity of the magnetic field will reverse the respective phases of this coupling.

As illustrated in Fig. 7, aperture 63 is not located on center line 64, however, but is displaced from line 64 as were apertures 14 of Fig. 1. Thus, aperture 63 couples into the displaced field pattern of wave energy in guide 60 at a point of zero longitudinal magnetic field components for waves propagated in the forward direction in guide 60. At this point the wave propagated in guide 60 in the backward direction has substantial longitudinal components.

Thus, microwave energy applied to guide 60 by way of terminal $a$ will not be coupled into guide 65 by aperture 63 since the longitudinal magnetic field components of this energy are zero at aperture 63. Therefore, all energy applied at terminal $a$ will appear at terminal $b$ of guide 60. This condition is indicated schematically on Fig. 8 by the arrow 70 running from radial arrow $a$ to the radial arrow $b$.

A wave applied to terminal *b* of guide 60 will, however, have substantial longitudinal magnetic field components at aperture 63 and a portion of this energy dependent upon the size and impedance of aperture 63 will be coupled into the guide 65. This condition is represented by arrow 71 on Fig. 8. The remaining portion of the energy applied at terminal *b* will pass on to terminal *a* as indicated by arrow 72 in Fig. 8 (it will be considered hereinafter how this remaining portion may be made very small).

A wave applied to terminal *c* of guide 65 will be coupled through aperture 63 into guide 60 for propagation in guide 60 to terminal *a* only. The magnitude of this coupled energy is determined by the size and impedance of aperture 63, and energy that is not coupled into guide 60 will be reflected back to terminal *c* (it will be considered hereinafter how this reflected component may be made very small). This connection is represented by arrow 73 on Fig. 8.

The unusual properties of the apparatus of Fig. 7 thus far described and as depicted schematically in Fig. 8 are ideally suited as the basis of a modulator circuit. Thus, a source of local oscillator signal 74 may be connected to terminal *c* as shown on Fig. 8, a source of intelligence signal 75 connected to terminal *b*, and a nonlinear detector 76 connected to terminal *a*. The modulated output is taken from detector 76. Coupling provided by aperture 63 is made small with the result that the coupling 71 is small and the coupling 72 is large. Thus, the local oscillator signal and the intelligence signal are combined in terminal *a* for application to detector 76 with substantially none of the modulated signal being returned to carrier source 74 and none of the oscillator signal reaching the source of intelligence signal 75.

Returning again to Fig. 7, a reactive impedance is added at terminal *c* to reflect a component of the wave coupled from terminal *b* to *c* back into line 60 in such phase and amplitude as to cancel the wave from terminal *b* which passes on to terminal *a*. This reactance may be a conductive septum 66 positioned transversely in guide 65 at a position above wall 67. Because of the thermal equilibrium requirements in the structure, septum 66 simultaneously serves the function of matching the impedance of terminal *c* for a wave applied thereto to that of terminal *a* through the coupling of aperture 63. Therefore, the size and position of septum 66 is selected most readily by applying a signal at terminal *c* and adjusting septum 66 until no wave energy is reflected back at terminal *c*. This adjustment may be made with the aid of a conventional standing wave detector. The resulting terminal connections are indicated schematically by Fig. 9, which shows that all energy applied to terminal *a* will be coupled to terminal *b*, all energy applied to terminal *b* will be coupled to terminal *c*, and all energy applied to terminal *c* will be coupled to terminal *a*. This then is the characteristic of a circulator circuit having three terminals.

Figure 10:
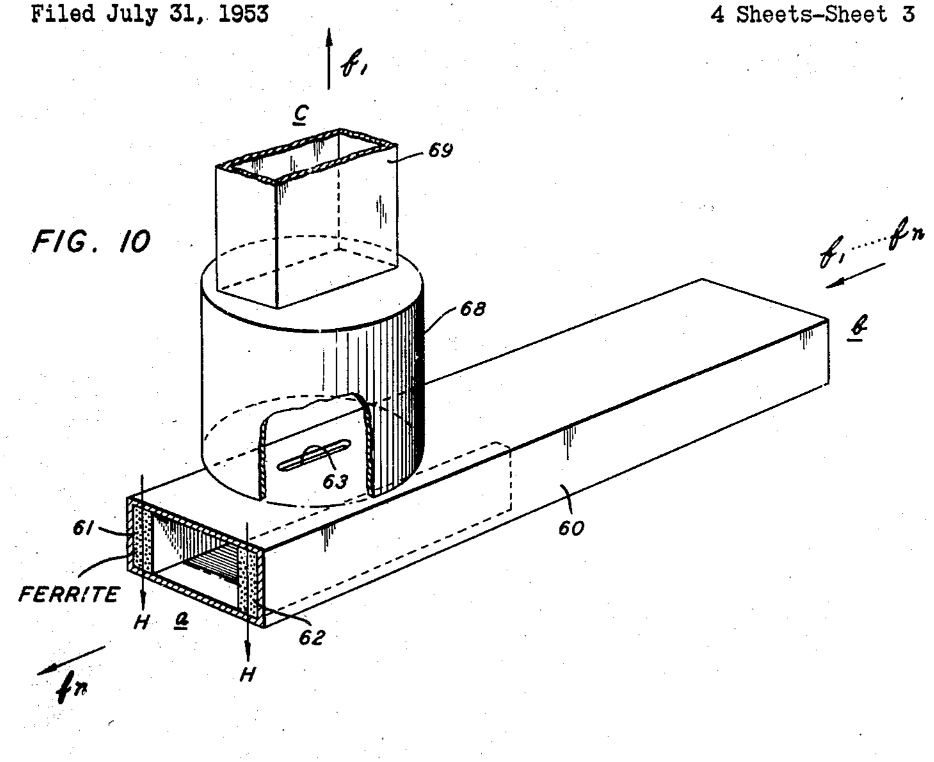
Fig. 10 shows a modification of the apparatus of Fig. 7 by which wave filter characteristics are included.

An alternative embodiment is represented in Fig. 10 in which guide 65 of Fig. 7 is replaced by a resonant chamber 68 coupled on one side to aperture 63 and on the other to output guide 69. Chamber 68 should have a diameter and a height substantially one free space wavelength of the resonant wave energy. Thus, only wave energy at the resonant frequency of chamber 68 is coupled from guide 60 to guide 69. Such an arrangement is ideally suited as a channel dropping filter in a multichannel microwave system in which the channels $f_1 \ldots f_n$ are applied to terminal *b*, channel $f_1$ being passed through chamber 68 to guide 69 and terminal *c* while the remaining channels $f_n$ are reflected back to appear at terminal *a*. Other arrangements for channel dropping filters as disclosed in the copending application of A. G. Fox, Serial No. 288,288, filed May 16, 1952, may be used.

Figures 11, 12:
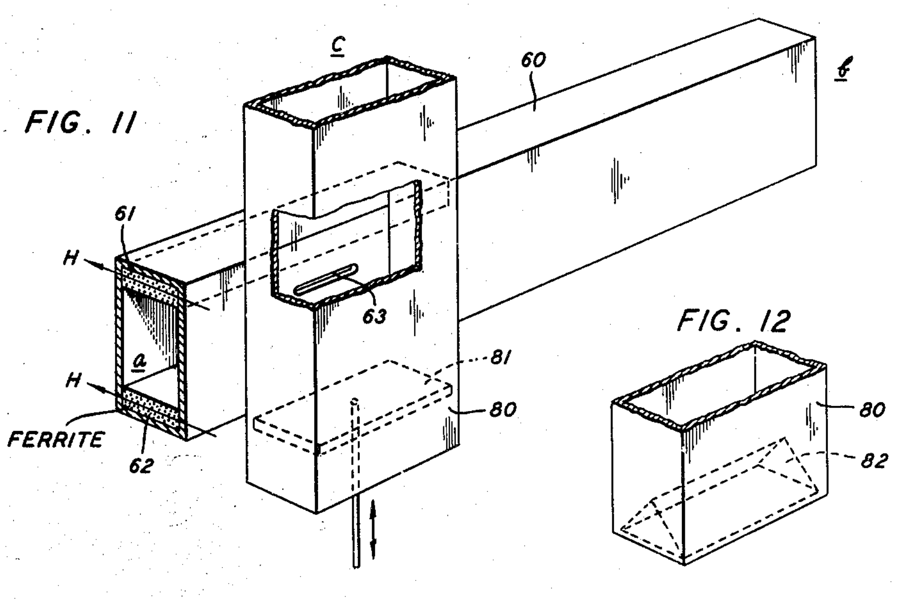
Fig. 11 is a perspective view of the third principal embodiment showing two crossed coupled guides utilizing the principles of the invention.
Fig. 12 is a partial view of the embodiment of Fig. 11 showing a modification thereof.

Another embodiment of the three terminal circulator is represented by Fig. 11 in which guide 80 is located to cross guide 60 with a wide wall of each guide contiguous and parallel, and the transverse planes and a longitudinal plane of each guide perpendicular. As in the preceding embodiments, aperture 63 couples to substantial longitudinal magnetic field components in guide 60 for wave energy propagating only in the direction from terminal *b* to terminal *a*. Aperture 63 couples symmetrically to the transverse magnetic field components in guide 80 for propagation in either direction therein. One end of guide 80 is terminated in an adjustable piston 81 of electrically conducting material.

Thus, wave energy applied to terminal *a* of guide 60 is transferred to terminal *b* thereof as in the preceding embodiments. Wave energy applied at terminal *b* is partially coupled into guide 80 by aperture 63, the remainder passing on in the direction of terminal *a* of guide 60. The portion of wave energy in guide 80 which travels toward piston 81 is reflected by piston 81 back to aperture 63. By adjusting the position of piston 81, the component of the reflected energy that returns through aperture 63 into guide 60 may be made to cancel the component of the wave energy which passed on toward terminal *a*. Thus, all of the coupled energy in guide 80 appears at terminal *c* thereof. Wave energy applied to terminal *c* of guide 80 will be coupled through aperture 63 into guide 60 for propagation therein to terminal *a* only. The preceding adjustment of piston 81 inherently matches the impedance of terminal *c* to terminal *a* for wave energy propagating along this path.

If piston 81 is replaced by a wedge of electrically lossy or absorbing material 82 as shown in Fig. 12, the apparatus of Fig. 11 exhibits electrical properties similar to those represented schematically in Fig. 8 and may be employed in the modulating circuit thereof with the additional advantage that a source of carrier signals connected to terminal *c* always sees a constant impedance in the form of lossy termination 82.

Figure 13:
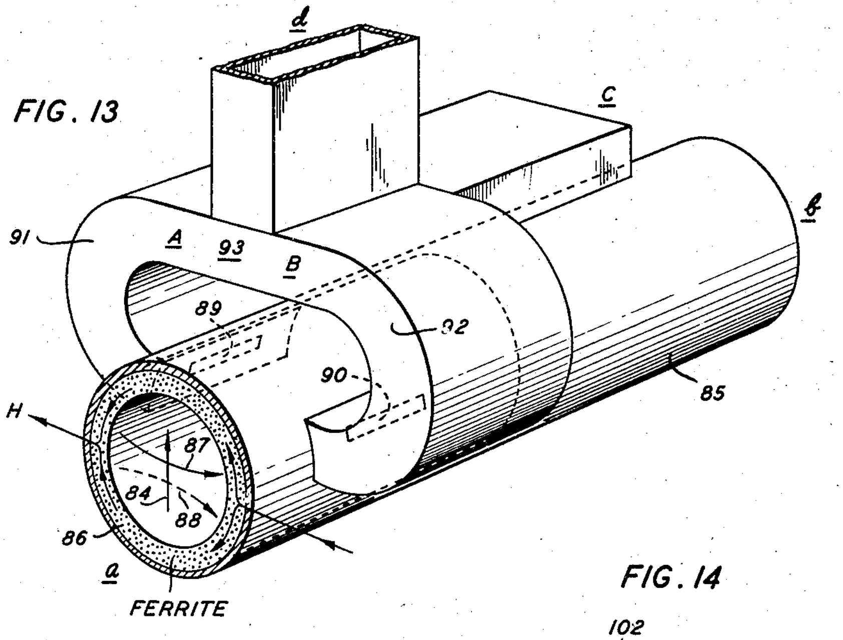
Fig. 13 shows an embodiment of the invention illustrating how the principles thereof may be applied to wave-guide systems of circular cross-section.

The principles of the invention may likewise be applied to wave guides of circular cross-section and to the modes of propagation found in these guides, particularly the dominant $TE_{11}$ mode. Such an embodiment is represented in Fig. 13 which shows a section 85 of wave guide of circular cross-section. A cylindrical liner element 86 of ferromagnetic material overlies the inner surface of circular wave guide 85. Liner 86 is biased by a magnetic field as represented by the branching vectors labeled H which travel, respectively, through the top and bottom halves of liner 86. This arrangement produces a field displacement of a horizontally polarized wave in guide 85 which is substantially identical to the displacement described above for a wave in rectangular wave guide. In other words, the center field of a wave propagating away from the viewer in guide 85 is displaced away from the diameter of guide 85 as represented by vector 87, while the center field of a wave propagating toward the viewed is displaced away from the diameter in the opposite direction, as represented by vector 88. In the regions where either vector 87 or vector 88 impinges upon the wall of guide 85, the longitudinal magnetic component of the wave for that direction of propagation is zero. Therefore, a longitudinal aperture located in this zero position with respect to vector 87, such as either aperture 89 or 90, would couple to a horizontally polarized wave propagating in guide 85 toward the viewer represented by vector 88, but will not couple to the wave propagating away from the viewer. Such a guide and coupling aperture combination could, therefore, be employed in the embodiments of the invention described hereinbefore. Note that the components which would be coupled through aperture 89 would be in phase with the components coupled through aperture 90 since the lines of magnetic field for the horizontal wave are in the same sense at each aperture.

Guide 85 will, in addition, support a vertically polarized wave such as represented by vector 84 on Fig. 13. Since the left-hand portion of the magnetic field of this wave is equally affected by the two oppositely biased portions of liner 86 on this side, and the same is true for the right-hand portion, the field pattern for the vertically polarized wave is not distorted by liner 86. It will, therefore, couple components for both directions of propagation along guide 85 into either aperture 89 or 90. Note that the components, however, are out of phase since the lines of magnetic field for the vertical wave are in opposite senses at each aperture.

By means of the unusual structure of Fig. 13, it is both possible to obtain a circulator connection with the horizontally polarized wave in guide 85, and also to simultaneously separate out the vertically polarized wave. This is done by coupling through both apertures 89 and 90, balancing the two in phase components of the horizontally polarized wave and the two out of phase components of the vertically polarized waves respectively against each other.

In Fig. 13, the balance is obtained in a conventional hybrid junction or microwave "magic-T" shown as 93. In phase waves applied at the horizontal arms A and B combine in the arm labeled *c* and cancel in the arm labeled *d*. Conversely, the out of phase waves applied in arms A and B combine in *d* and cancel in *c*. Apertures 89 and 90 are coupled, respectively, by bending sections of wave guide 91 and 92 to arms A and B of junction 93.

Consider first a vertically polarized wave 84 applied to terminal *a* of guide 85. Since the field pattern of this wave is not distorted, it couples in equal, out of phase components to apertures 89 and 90, which components then combine in hybrid junction 93 to emerge at terminal *d* thereof. This connection is reciprocal so that a wave applied at terminal *d* of hybrid 93 will appear as a vertically polarized wave in guide 85.

The horizontally polarized wave applied at terminal *a* of guide 85, as noted above, will be displaced as represented by vector 87 and will pass unaffected by apertures 89 and 90 to terminal *b* of guide 85. A wave applied to terminal *b* will be displaced as represented by vector 88 and will, therefore, have substantial longitudinal magnetic field components at apertures 89 and 90. These components excite equal in phase waves in guides 91 and 92 which will combine in terminal *c* of hybrid 93. Similarly, a wave applied at terminal *c* will excite in phase waves in guides 91 and 92 which will, therefore, couple to wave energy in guide 85 propagating toward terminal *a*. By means of a balancing scheme similar to that employed in the embodiments of Figs. 7 and 11, terminal *c* may be matched to terminal *a* which will also mean that terminal *b* will be matched to terminal *c*. A three terminal circulator employing the horizontally polarized mode in guide 85 is, therefore, obtained having electrical properties represented schematically by Fig. 9.

In the preceding embodiments the magnetic field displacement underlying the principles of the invention has been obtained by two slab-like elements of ferromagnetic material located adjacent to either narrow wall of a section of wave guide. It should be noted, however, that a single element on either side would produce a displacement of the same sort except that the displacement obtained by a single element would be somewhat smaller than that obtained with two elements. The element may be moved away from the narrow wall so long as an asymmetrical relation in the field pattern of the energy is maintained. Also, the guide could be completely filled with the ferromagnetic material, but this may increase unnecessarily the amount of loss introduced by the dielectric of the ferromagnetic material and also necessitate reducing the cross-section of the guide in the region of coupling to avoid the support in the guide of unwanted higher order modes of propagation. Other alternative embodiments for obtaining a satisfactory field displacement are shown in Figs. 14 through 16, each having various relative advantages and disadvantages.

Figure 14:
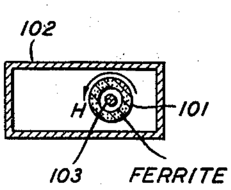
Figs. 14 through 16 show, in cross-sectional views, other configurations for field displacement media of polarized gyromagnetic material which may alternatively be employed in any of the above-described embodiments.

In Fig. 14, the ferromagnetic element takes the form of a hollow tube 101, which may be either rectangular, or circular in cross-section as shown, located asymmetrically in the cross-section of guide 102. Tube 101 is biased circumferentially by a magnetic field, as represented by vector H. This structure has the advantage that the field may be simply provided by current carrying conductor 103 running down the center of tube 101. Since the circumferential field finds a closed magnetic path in the tube 101, the structure is particularly suitable for being permanently magnetized.

Figure 15:
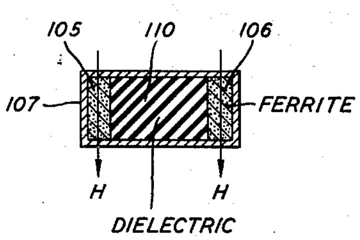

In Fig. 15, two elements 105 and 106, as in the preceding embodiments, are located adjacent to the narrow walls of guide 107. The region between elements 105 and 106 is filled with a dielectric material 110 of low loss and having a dielectric constant greater than that of free space. The addition of dielectric material 110 enhances the displacement effect.

Figure 16:
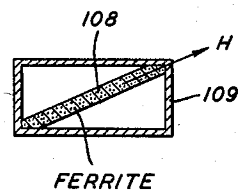

In Fig. 16, the ferromagnetic element 108 is a thin sheet located diagonally across guide 109 and biased by a diagonal field as represented by vector H. Sheet 108 may be self-supporting or it may be supported by low loss dielectric members. This structure has particular advantage in that while producing a displacement of the field as described above, it leaves the energy distribution throughout the cross-section of the guide in a more normal manner despite the high dielectric of the ferromagnetic material. It also is a particularly advantageous structure from a mechanical standpoint due to its simplicity and the ease with which the biasing magnetic field may be applied.

It is understood that in all embodiments the ferromagnetic elements may be introduced by tapers sufficiently long, in the order of several wavelentghs, to prevent undue reflections from the edges or sides thereof encountered by the wave energy. Thus, the elements disclosed herein in cross-sectional views as rectangular blocks would become wedge-shaped, reaching their maximum cross-sectional dimensions only in the region of coupling.

In all cases, it is to be understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An electromagnetic wave transmission path adapted for propagating wave energy in respectively opposite longitudinal directions, means in a longitudinally extending region along said path for transversely concentrating the longitudinal lines of magnetic field of said wave energy in said region, the direction of said transverse concentration being to opposite sides of the longitudinal axis of said transmission path for opposite longitudinal directions of propagation along said path, and means for coupling exclusively to said longitudinal lines of magnetic field along said longitudinally extending region in which the longitudinal magnetic field concentration is different for said opposite directions of propagation along said path.

2. The combination of claim 1, wherein said coupled means is coupled into the field pattern of said energy at a location of zero longitudinal magnetic field concentration for one direction of propagation along said path.

3. In an electromagnetic wave transmission system, a conductively bounded wave transmission medium, said medium presenting to wave energy propagating therethrough an asymmetrical permeability characteristic across its transverse cross-section to concentrate the field pattern of said wave energy asymmetrically in said cross-section, said characteristic being different for opposite directions of propagation of said wave energy along said medium so that the regions of corresponding intensity in the field patterns of energy propagating in said opposite directions past said cross-section appear in dissimilar positions in said cross-section, and means for coupling into the field pattern of said energy in a region of different intensity for said opposite directions.

4. In combination, a section of shielded transmission line for supporting electromagnetic wave energy, means for applying said energy to said line, and an element of magnetically polarized gyromagnetic material extending for a length within said line, the shield of said line in a portion that is coextensive with said element having at least one aperture extending therethrough at a point where the longitudinal component of the magnetic field of said wave energy within said line is zero for one direction of propagation of said wave along said line.

5. In combination, a first section of wave guide of rectangular cross-section, said guide having a pair of wide and a pair of narrow conductive walls, at least one element of ferromagnetic material included within said guide, means for applying a magnetizing field to said element, and a second wave guiding structure coupled to said first guide in the region including said material over a fractional portion of one of said wide walls, said portion being displaced off the longitudinal center line of said wide wall.

6. The combination of claim 5, wherein said second structure is a rectangular wave guide having a narrow wall thereof contiguous to said wide wall, said contiguous walls having a plurality of apertures extending therethrough.

7. The combination of claim 5, wherein said second structure comprises a rectangular wave guide having a transverse end, said end abutting said wide wall, said wide wall having an aperture therein within the area abutted by said end.

8. The combination according to claim 7, including a reactive means located in said second structure whereby the impedance of said second structure is matched to the impedance of one end of said first guide for energy applied to said second structure and to the impedance of the other end of said first guide for energy leaving said second structure.

9. The combination according to claim 5, wherein said second structure is a second rectangular wave guide having a wide wall thereof contiguous to said wide wall of said first guide, said first and second guides having their transverse planes and a longitudinal plane of each perpendicular to each other, said contiguous walls having an aperture extending therethrough.

10. The combination according to claim 9, wherein one end of said second guide is terminated in a reflecting piston.

11. The combination according to claim 9, wherein one end of said second guide is terminated in an absorbing termination.

12. The combination according to claim 5, wherein said wide wall has a longitudinal slot extending through said portion on said wide wall, a conductive channel located adjacent said wide wall to enclose said slot, and dissipative material included within said channel.

13. The combination of claim 5, wherein said second structure is a resonant wave-guide chamber positioned adjacent said wide wall, said wide wall having an aperture therein coupling into said chamber.

14. The combination according to claim 5, wherein said ferromagnetic material is slab-like and extends longitudinally in said first guide adjacent one of said narrow walls and wherein said field is applied transversely to said first guide.

15. The combination according to claim 5, wherein said element of ferromagnetic material is a hollow tube located asymmetrically in the cross-section of said first guide and wherein said field is applied circumferentially to said tube.

16. The combination according to claim 14, including a pair of ferromagnetic slabs located adjacent both said narrow walls of said first guide.

17. The combination according to claim 16, wherein the space betwen said pair of slabs is filled with a dielectric material having a dielectric constant nearer to the dielectric constant of said ferromagnetic material than to the dielectric constant of air.

18. The combination according to claim 5, wherein said element is a thin sheet of ferromagnetic material extending diagonally across the transverse cross-section of said first guide.

19. The combination according to claim 3, wherein said medium comprises a section of shielded wave guide of circular cross-section, and a liner of ferromagnetic material included within the shield of said section, said shield of said section having a pair of apertures extending therethrough, said apertures being located on the same side of a diametrical plane of said section.

20. The combination according to claim 19, including a four branch microwave hybrid junction, said junction having two of said branches respectively connected to said apertures.

References Cited in the file of this patent

UNITED STATES PATENTS

| | | |
|---|---|---|
| 2,627,573 | Riblet | Feb. 3, 1953 |
| 2,644,930 | Luhrs | July 7, 1953 |
| 2,649,574 | Mason | Aug. 18, 1953 |
| 2,745,069 | Hewitt | May 8, 1956 |

OTHER REFERENCES

Publication I, Riblet, "The Short Slot Hybrid Junction," Proc. of the I. R. E., vol. 40, No. 2, February 1952, pages 180–184.

Publication II, Kales et al., "A Nonreciprocal Microwave Component," Journal of Applied Physics, June 1953.

Disclaimer 2,849,683.—*Stewart E. Miller*, Middletown, N.J. NON-RECIPROCAL WAVE TRANSMISSION. Patent dated Aug. 26, 1958. Disclaimer filed May 22, 1964, by the assignee, *Bell Telephone Laboratories, Incorporated.*

Hereby enters this disclaimer to claim 3 of said patent.

[*Official Gazette August 18, 1964.*]